(12) United States Patent
Taylor

(10) Patent No.: US 6,741,738 B2
(45) Date of Patent: May 25, 2004

(54) METHOD OF OPTICAL MARK RECOGNITION

(75) Inventor: Garland S. Taylor, Stillwater, OK (US)

(73) Assignee: TMS, Inc., Stillwater, OK (US)

( * ) Notice: Subject to any disclaimer, the term of this patent is extended or adjusted under 35 U.S.C. 154(b) by 583 days.

(21) Appl. No.: 09/776,439

(22) Filed: Feb. 2, 2001

(65) Prior Publication Data

US 2001/0033688 A1 Oct. 25, 2001

Related U.S. Application Data

(60) Provisional application No. 60/188,781, filed on Mar. 13, 2000.

(51) Int. Cl.$^7$ ................................................. G06K 9/00
(52) U.S. Cl. ..................... 382/187; 382/188; 382/203; 382/294; 358/452; 358/453; 358/450
(58) Field of Search ................................. 382/103, 108, 382/112, 113, 116, 151, 187, 188, 184, 190, 201, 203, 209, 216, 224, 282, 284, 287, 291, 294; 358/538, 540, 450, 452

(56) References Cited

U.S. PATENT DOCUMENTS

| | | |
|---|---|---|
| 4,633,507 A | 12/1986 | Cannistra et al. |
| 4,635,293 A | 1/1987 | Watanabe |
| 4,637,057 A | 1/1987 | Kermisch |
| 4,707,710 A | 11/1987 | Shinada |
| 4,723,297 A | 2/1988 | Postl |
| 4,829,452 A | 5/1989 | Kang et al. |
| 5,001,769 A | 3/1991 | Reid-Green et al. |
| 5,017,763 A | 5/1991 | Shepard |
| 5,020,123 A | 5/1991 | Thompson |
| 5,050,225 A | 9/1991 | Itoh |
| 5,060,980 A | 10/1991 | Johnson et al. |
| 5,084,769 A | 1/1992 | Miura |
| 5,085,587 A | 2/1992 | DesForges et al. |
| 5,101,447 A | 3/1992 | Sokoloff et al. |
| 5,102,341 A | 4/1992 | Koslin |
| 5,140,139 A | 8/1992 | Shepard |
| 5,184,003 A | 2/1993 | McMillin et al. |
| 5,187,753 A | 2/1993 | Bloomberg et al. |
| 5,231,663 A | 7/1993 | Earl et al. |
| 5,233,168 A | 8/1993 | Kulik |
| 5,235,655 A | 8/1993 | Hikawa |
| 5,452,379 A | 9/1995 | Poor |
| 5,572,601 A | 11/1996 | Bloomberg |
| 5,592,573 A | 1/1997 | Eisenbarth et al. |
| 5,617,481 A | 4/1997 | Nakamura |
| 5,672,060 A | 9/1997 | Poor |
| 5,682,153 A | * 10/1997 | Ishiguro ...................... 341/53 |
| 5,748,809 A | 5/1998 | Hirsch |
| 5,793,887 A | 8/1998 | Zlotnick |
| 5,920,658 A | 7/1999 | Yamagata et al. |
| 5,987,149 A | 11/1999 | Poor |
| 5,987,191 A | 11/1999 | Suzuki |
| 6,021,220 A | * 2/2000 | Anderholm ................. 382/194 |
| 6,065,065 A | * 5/2000 | Murakami et al. .......... 709/250 |
| 6,081,620 A | * 6/2000 | Anderholm ................. 382/194 |
| 6,621,941 B1 | * 9/2003 | Syeda-Mahmood et al. ......................... 382/306 |

* cited by examiner

Primary Examiner—Timothy M. Johnson
Assistant Examiner—Yosef Kassa
(74) Attorney, Agent, or Firm—Fellers, Snider, Blankenship, Bailey & Tippens, P.C.

(57) ABSTRACT

There is provided herein a new method of identifying when a particular hand-drawn selection has been made on, for example, a standardized test form. This method does not require the use of any particular form nor does it use registration marks. It is robust enough to be used when the form is somewhat misaligned on the scanning device. This method utilizes a scanned "blank" form which is then compared with a form containing user markings thereon. As a first step, the user's form is mathematically iteratively aligned with the scanned blank form. As a next step, a fine-scale refinement is applied to each individual "bubble" (i.e., response field) of the user's form to bring that feature into near exact alignment with the same bubble on the blank form. Finally, a quantitative measure of the similarity between the blank and user forms is used to determine whether or not the user has made a mark on the form within that response region.

37 Claims, 16 Drawing Sheets

Affine Transform

Figure 3

Computation of Transform

General Form $$x' = M_x \cdot x + S_x \cdot y + T_x \qquad y' = M_y \cdot y + S_y \cdot x + T_y$$

Simultaneous Equations $$x_1' = M_x \cdot x_1 + S_x \cdot y_1 + T_x \qquad y_1' = M_y \cdot y_1 + S_y \cdot x_1 + T_y$$
$$x_2' = M_x \cdot x_2 + S_x \cdot y_2 + T_x \qquad y_2' = M_y \cdot y_2 + S_y \cdot x_2 + T_y$$
$$x_3' = M_x \cdot x_3 + S_x \cdot y_3 + T_x \qquad y_3' = M_y \cdot y_3 + S_y \cdot x_3 + T_y$$

Bubble Alignment

METHOD OF OPTICAL MARK RECOGNITION

CROSS-REFERENCE TO RELATED APPLICATION

This application is the benefit of U.S. Provisional Application No. 60/188,781, filed Mar. 13, 2000.

FIELD OF THE INVENTION

The present invention relates to the general subject matter of optical mark recognition ("OMR", hereinafter), and more particularly, to methods and apparatus for automatic recognition of when a hand-drawn mark has been made within a particular region of a user-completed document such as a standardized test form.

BACKGROUND OF THE INVENTION

The use of machine readable forms has been steadily increasing in popularity for obvious reasons, perhaps the foremost of which is that these devices provide a means of automatically gathering very large numbers of human responses. A common scenario involves a user being asked to make (pencil) marks in specific regions of a pre-printed form in order to designate answers to various queries. The form containing the user's pencil marks is then later "read" or scored via some sort of computer-assisted process which determines which responses the user has designated and tabulates those responses for later reporting. Of course, most people are introduced to machine-readable forms when they take their first "standardized test", wherein the user fills in "bubbles" to signify which answer to a multiple choice question is felt to be correct. However, this same technology is useful in many other fields including use in reading survey questionnaires, census data, inventory control, market research, and many others.

Key to the development of this industry has been the continuous improvement in hardware and software that make the machine-reading of a piece of paper bearing marks made by a human a relatively reliable prospect. In a typical application there may be as many hundreds or even thousands of forms that are loaded into a "hopper" or other receptacle that feeds the form reader. Thus, it is imperative that the process of reading the marks be as reliable as possible.

The process of reading a user-marked form conventionally begins with careful registration of the form that is to be read. At the outset, the registration step is purely a mechanical one. A specialized form reader seizes each form in turn and then positions it—as nearly as is possible—in precisely the same position so that the various fields on the form are in predetermined locations. Generally speaking, prior art devices require a high degree of accuracy in the initial placement of the form as a prerequisite to their working effectively.

As a next step, the form is converted to a digital format by optical scanning. The conventional arrangement calls for the scanner to be two-level or bi-level scanner, sensing only either "white" or "black" pixels on the form. It has not been customary for the scan to be in color or gray scale, as the object is to determine whether or not a mark is present and a two-level scan is adequate for that purpose.

Obviously, if the form has been accurately registered and oriented, the optical scanner need only "look" in those specific locations on the form where the user has been directed to make marks ("active areas", hereinafter) in order to find the user's responses. However, it is not uncommon for there to be some small amount of inaccuracy in the physical placement of the form within the reader. For example, the form might be slightly shifted in one or both lateral dimensions (i.e., horizontal and vertical), or even stretched or rotated. Thus, it is conventional to take some form of corrective action after the form has been converted to digital values in order align it.

Many existing systems require the use of specialized "registration marks," (also known as "fiducial" marks) which are intended to be easily recognized and which have been printed on the form at precisely predetermined locations. When these marks are present on the form, computer algorithms can then be used to examine the digital representation of the form and locate these marks, assuming that they can be located. Given the actual location of the registration marks on the scanned image and a different desired location, mathematical transformations may be used to digitally reorient the form within the computer so the active areas coincide with those of a perfectly registered form. Alternatively, the scanned form maybe left uncorrected and this same sort of transformation used to calculate where the active areas actually may be found on the form as-read.

Even if the active regions on the form have been accurately determined, the process of "reading" the mark is not as simple as it might seem. Bubbles might be partially filled or filled completely and lightly or darkly colored. Further, imperfect erasures on the form can be confused with the intended mark so differentiating between those (and other extraneous) marks is a high priority.

The current state-of-the-art in automatic grading begins with the preparation of the forms, which must be printed with extreme precision: conventional laser printing is not usually precise enough. The printed text and bubbles must be accurately located with respect to the edges of the form and with respect to each other. This is because even slight variations in the locations of the printed bubbles can make it difficult if not impossible for an automatic scoring system to later read the user's answers. A further requirement of current methods of mark detection is that the form be precisely aligned before it is scanned into memory, so that the resulting scanned image has bubbles located in highly predictable locations.

In some instances, special inks are used to print the form (so-called "drop-out inks") which become effectively "invisible" when scanned using light at certain wavelengths (e.g., infrared light). Then, when the form is subsequently scanned using light of the appropriate wavelength, the printed form appears nearly invisible, and only the user's marks effectively remain. However, use of specialized inks can dramatically increase the complexity and cost of printing the forms. Obviously, there would an economic advantage to a method of OMR that could work reliably with conventional printers, inks, and scanners.

Further, the prior art methods of automated scoring/grading of tests involve the use of expensive specialized scanning devices that automatically sense the edges of each page and then mechanically move that page into proper position before it is scanned. Thus, when the form is scanned, the scoring software should always know exactly where each bubble or other response region may be found. However, these specialized machines are expensive and subject to mechanical failure.

Still further, even if the marked form has been correctly registered and scanned, reading the marks thereon may still represent a significant challenge. For example, even something as conceptually simple as locating a specific response region (e.g., bubble) on the scanned form is complicated by the fact that the bubble could potentially be offset from its theoretical location by a few pixels, even if everything is accurately registered. Additionally, differentiating the form's printed background information from the user's mark, differentiating lightly marked selections from erasures, and a host of other practical problems stand in the way of anyone who would seek to develop a system of automatically scoring these sorts of tests.

Heretofore, as is well known in the optical mark recognition arts, there has been a need for an invention to address and solve the above-described problems. Accordingly, it should now be recognized, as was recognized by the present inventor, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided hereinafter a new method of identifying when a particular hand-drawn selection has been made on, for example, a standardized test form. This method does not require the use of any particular form design nor does it use registration marks. It is robust enough to be used when the form is somewhat misaligned on the scanning device.

According to a first aspect of the instant invention, there is provided a method of reading or determining the mark sense of a user-marked form, which begins by storing in computer memory or hard disk a digital image of a blank copy of the form which the user has been asked to mark. In the preferred embodiment, the digital image will be a high-resolution color (e.g., 8 bit) scan of the form which has been obtained by scanning a blank form.

As a next step, a user-marked form is obtained in digital form. Preferably, this also will be a high-resolution color scan of the marked form which has been scanned at the same resolution as the blank form.

Then, the digital version of the user-marked form is mathematically "shifted" to make it correspond as closely as possible to the orientation of the scanned blank form. The preferred method of doing this utilizes an iterative procedure, wherein successively higher resolution versions of the two forms are used at each iteration, where the term "resolution" is used herein in its broadest sense to refer to varying levels of information content in the scanned image. Methods of obtaining versions of an image at a variety of different "resolutions" are discussed hereinafter. At the final step, the calculated image shift should only amount to a few pixels.

The instant method continues by selecting a first field (e.g., a "bubble" on the form) to examine. The bubble is found at a known location on the scanned-blank form and its location is known at least approximately on the user-marked form. Then, the small region of the user's form containing the bubble (which may or may not contain a user mark) is locally realigned to make it match as nearly as possible the alignment of the standard (blank) bubble. This prepares the user-scanned form for use in the steps that follow.

In the preferred embodiment, the next step involves the calculation and application of an optional intensity variance adjustment, which is designed to correct for a common defect that can be introduced by high-speed scanners. Preferably, the adjustment is effected by comparing the mean image intensity/brightness in two or more corresponding regions in the scanned blank and user-marked forms. Using the brightness of the corresponding portions of the two images, a transformation is mathematically determined that is designed to smoothly correct for observed differences in overall image intensity. The intensity correction is preferably interpolated in areas between the reference regions.

Finally, once the two bubbles are in the best possible alignment and the image intensities are comparable, a score is calculated that reflects the degree of similarity between the unmarked bubble (from the reference image) and the potentially marked bubble. Based on this objectively calculated value, a determination is made as to whether or not the form as been marked. Additionally, depending on the resulting score, an assessment may be made as to whether or not the particular bubble shows evidence or an erasure or other artifact on the form.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to cover all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

BRIEF DESCRIPTION OF THE DRAWINGS

FIG. 3 gives the general form of the affine transform as it is preferably used herein.

DETAILED DESCRIPTION OF THE PREFERRED EMBODIMENTS

PAGE ALIGNMENT

Figure 1:
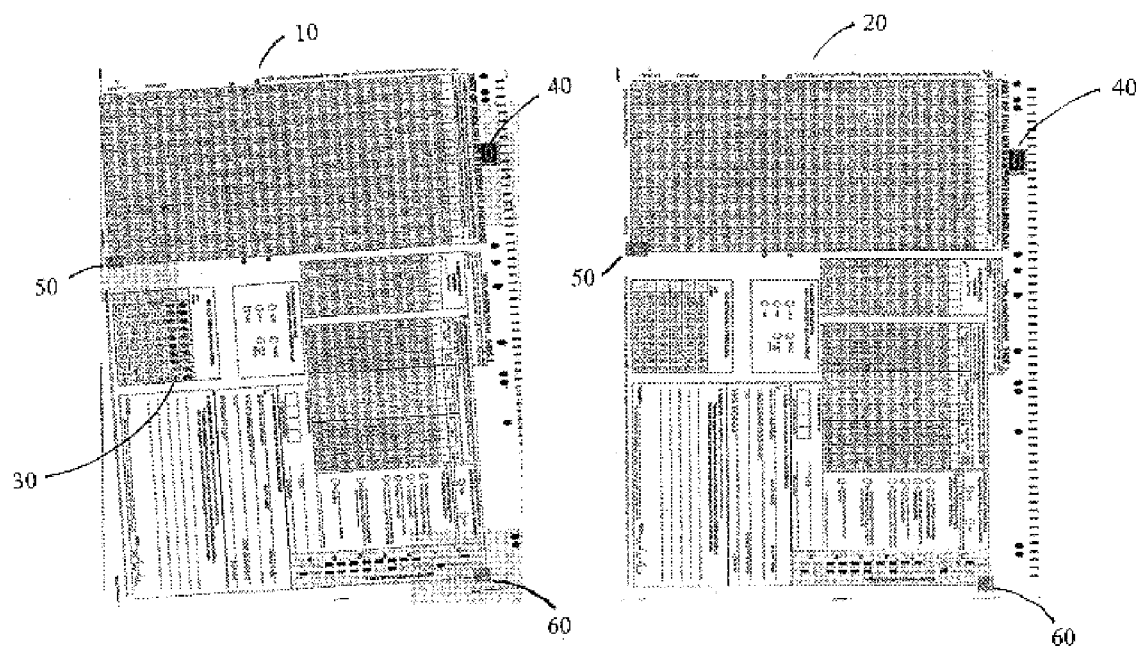
FIG. 1 contains exemplar blank and marked forms.

According to a first preferred embodiment of the instant invention, there is provided a method of digitally reorienting a scanned user-marked form to position it accurately for further processing. As a first step and as is generally illustrated in FIG. 1, a completely blank form 20 of the type which the user has been asked to mark is obtained in digital form (Step 810, FIG. 8), preferably by scanning a printed copy of the form. Of course, in those instances where the form is available in electronic form (e.g., as a PDF file, RTF file, postscript source file, word processing file, or any other electronic "description" of the blank form) the computer file containing the form can easily be converted to its digital equivalent at any desired resolution by methods well known to those of ordinary skill in the art.

Preferably, the digital representation of the blank form should be at a resolution of at least 100 dpi, although other resolutions may certain be used. Additionally, it is preferred that the image be a color or gray-scale image which is preferably at least 4 bits deep (gray scale) or 8 bits deep if a color scan has been taken. The digital blank form will be used as a "reference" image in the steps that follow and the user's marked form will be compared against it. Note that use of reference image is a critical aspect of the instant invention and the current state-of-the-art in OMR does not utilize a scanned control or reference image. Note also that, for purposes of specificity, in the text that follows the term "scan" will be used generically to describe converting an electronic or printed form into a digital representation, whether that conversion is actually by way of conventional "scanning" or by some other method.

As a next step, the scoring process begins by optically scanning (digitizing) a user-marked form 10 (i.e., the "target" form) using a conventional scanner, with the resulting digital representation being stored into computer memory and/or disk. Preferably, the scan should be at a same pixel resolution and color depth as that of the reference image, although that is not strictly required.

Alignment Using the Affine Transformation

Figure 2:
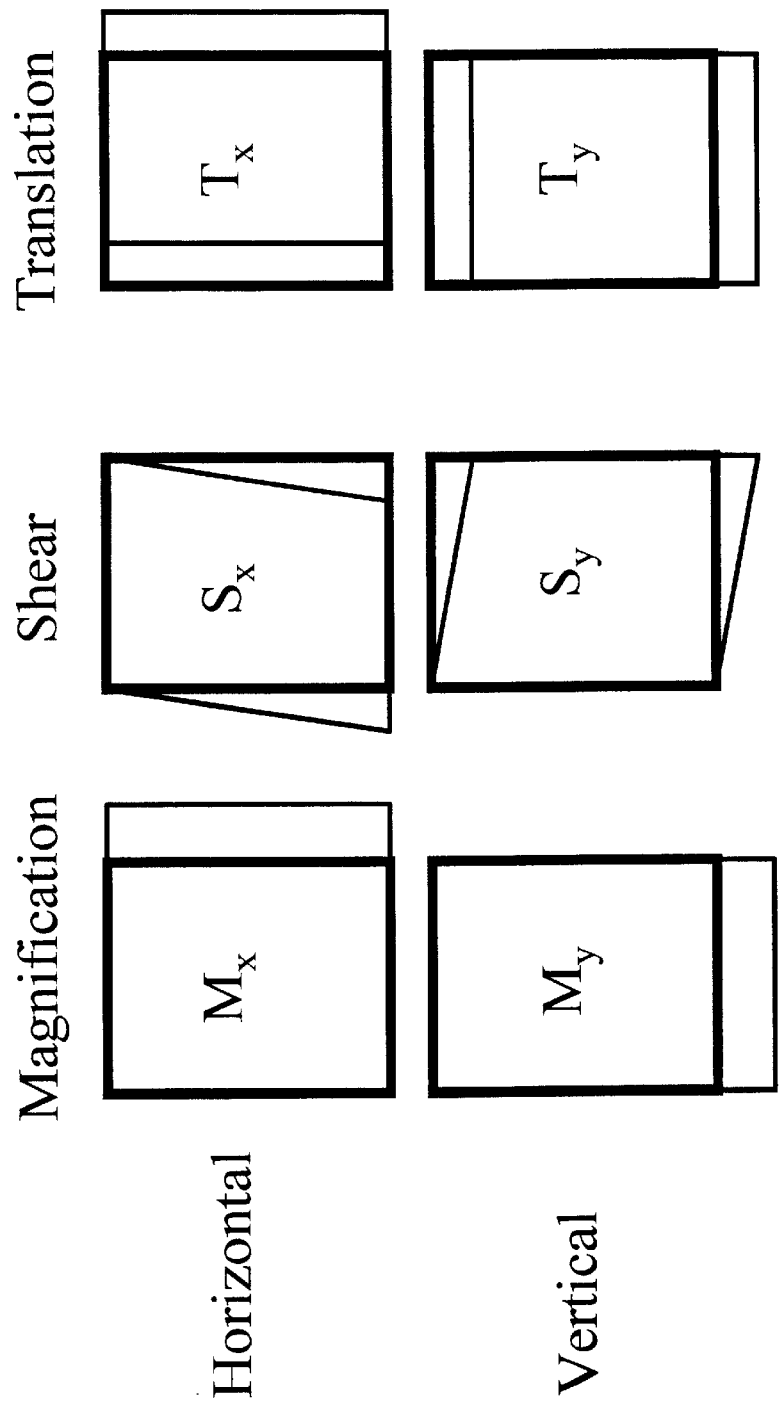
FIG. 2 illustrates some of the sorts of problems in the scanned user-marked image that the affine transform may be used to correct.

The process of scanning the marked form into a digital format, however, often yields an unsatisfactory representation because it is common for the scanned image to be misaligned and/or skewed on the scanner as is generally illustrated in form 10 of FIG. 1. Thus, a first preferred next step of the instant invention is to correct the scanned image of the marked form 10 to orient it properly with respect to the pre-scanned blank form 20 (i.e., roughly register it with respect to the blank form 20). As is generally illustrated in FIG. 2, the class of transformations that are preferably used are those which involve magnifying, shearing, and/or translating the scanned target form 10 to make it digitally overlay as nearly as possible the blank form 20. Optionally, additional corrections may be applied to the image which distort it in arbitrary ways. A preferred such correction is discussed hereinafter. Correction of the rotation of the target form 10 with respect to the blank form 20 will not be considered herein, although those of ordinary skill in the art will recognize that the method could easily be extended to include that sort of operation. Finally, what ever transformation methodology is used, the end product of such a calculation will be a mathematical formula or "rule" for adjusting one image with respect to the other to cause them to be as closely registered as possible.

In the preferred embodiment, an "affine" transformation is used to mathematically adjust the relative orientation of the two forms so that they match as nearly as is possible. Those of ordinary skill in the art will be generally familiar with the computation of the affine transform and how it is typically used in image processing for purposes of image registration. If fewer than three "anchor" pairs are available, a subset of the affine transformation is used. If more than three pairs are available, an affine transformation is selected that best represents the given pairs and the residual alignment information is stored for later interpolation, preferably using the Delaunay triangulation discussed hereinafter.

The affine transform alignment calculation preferably utilizes three difference reference bitmaps. However, if more than three anchor regions are selected, the affine transformation is preferably calculated by least median squares which is a well known robust regression variant wherein the resulting fit is the one whose median squared deviation is minimized. Of course, those of ordinary skill in the art will recognize that there are any number of alternative fitting criteria that could be used instead including, for example, least absolute deviation, ridge regression, or any other robust/resistant alternative to least squares.

That being said, in the preferred embodiment—and given more than three anchor regions—the instant method preferably searches the zone about each anchor point (preferably by the method discussed below) for the best match between the region on the blank form 20 and the target form 10. Doing this for each of the anchor regions, will produce as many different estimates of lateral offset as there are regions. Now, each match is assigned a "cost", which preferably reflects how well the two corresponding regions on the blank and target form match, with low values of the cost function corresponding to better fits. After costs are assigned to a pair of anchors, optionally poor matches (e.g., matches whose cost exceeds a certain predetermined threshold) are discarded and not used further in the fitting process.

Now, to determine the affine transform that best aligns the marked image with the control, a least median squares algorithm is used and is preferably implemented as follows. For each possible set of three pairs of matching anchor zones, an affine transform is calculated that precisely aligns the three zones. Then, the calculated affine transform is preferably applied to all of the anchor regions that have been selected, thereby producing transformed locations for each.

A "transformed offset" is then computed for each of the transformed locations which represents the distance (after application of that particular affine transform) between the corresponding regions on the two forms. Needless to say, for those pairs that have been precisely aligned, the discrepancy will be zero. The "goodness of fit" for this particular affine transform is then calculated, which preferably will be the median of the squared distances. Obviously, by repeating this will different affine transforms (i.e., by selecting different matching anchor zones) a set of "fits" will be produced, the smallest of which is preferably the affine transform of choice.

Alignment Using Delaunay Triangulation

As a next optional step, a supplemental transformation based on interpolation between arbitrarily selected data points may be calculated, preferably using a non-linear Delaunay triangulation of the image space. In the preferred embodiment, the instant method would be applied to the residual error remaining after calculation of an affine transformation, although that is not strictly necessary and, if desired, the instant method could be applied directly to the offset information used to calculate the affine transformation as discussed previously.

Figure 12B:
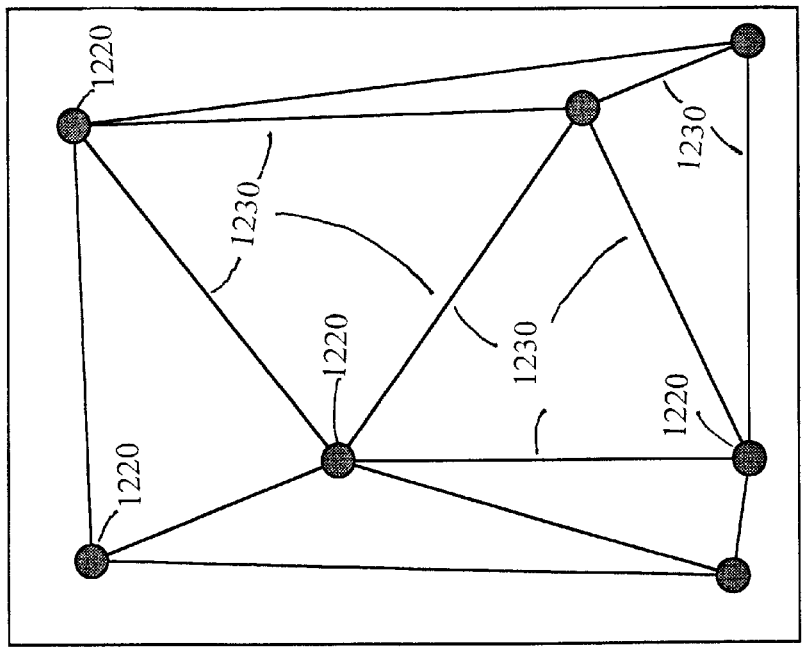
FIGS. 12A and 12B illustrate a preferred method of constructing the references regions which are used in the computation of Delaunay triangulation.
Figure 12A:
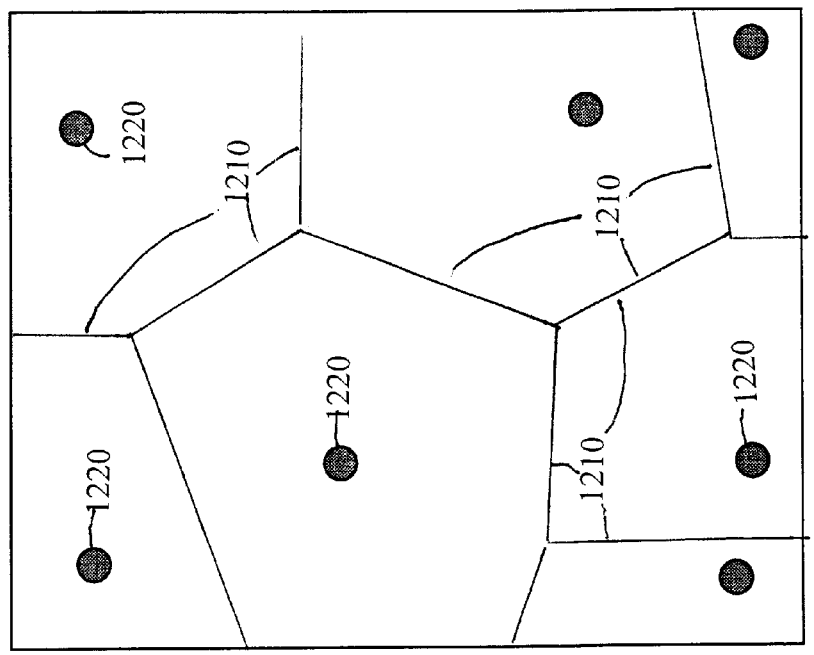
Figure 13A:
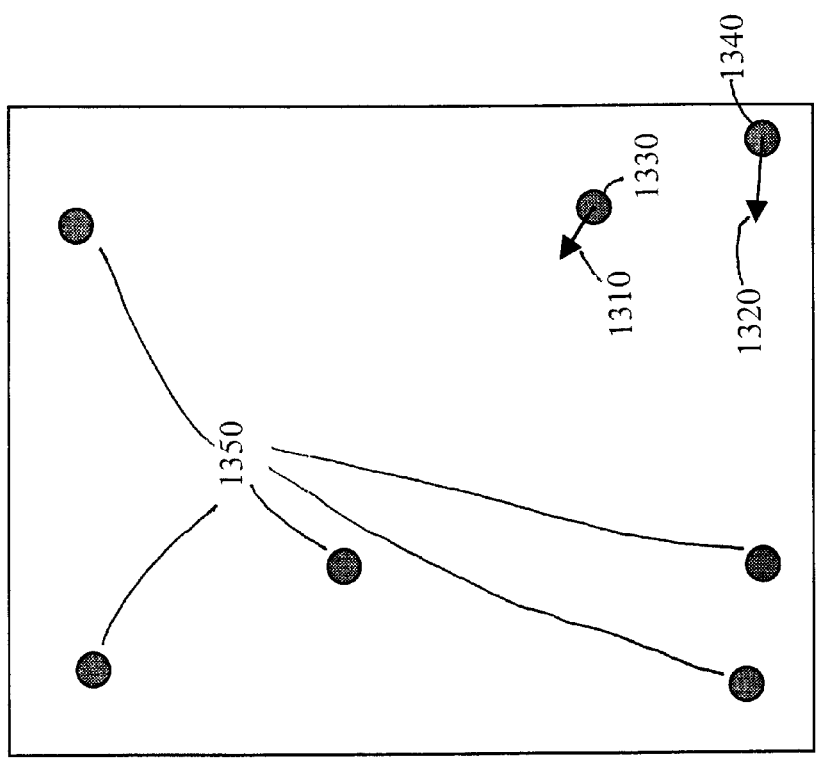
FIGS. 13A and 13B illustrate an example wherein distortion has been introduced in the lower right hand corner of the image.

Turning first to FIG. 12A, as an initial step four or more centroids 1220 are selected which preferably correspond to distinct features of the image. For each of these centroids 1220, an offset distance is calculated, preferably as described hereinafter, between the feature on the target form 10 and the same feature on the blank form 20. Thus, the result of this computation is an X and Y offset that is to be separately applied to each of the centroids 1220 in order to bring it into alignment. In the unlikely event that all of these offsets are numerically the same for each of the centroids 1220, that would indicate that a simple linear shift should be applied to the entire target 10 form in order to bring it into alignment with the blank form 20. On the other hand, and as is generally indicated in FIG. 13A, the more likely case is that the calculated amount of offset will be different for each of the centroids 1220. For purposes of illustration in FIG. 13A, a situation has been depicted wherein the target form 10 exhibits some degree of distortion in its lower right corner. The amount of distortion that is present in the target form 10 is illustrated schematically by the magnitude of the arrow that extends from the midpoint of centroids 1330 and 1340. In this example, it has been determined that the centroid 1330 needs to be moved so that it is centered about the tip of arrow 1310 in order to align it as much as is possible with the corresponding feature on the blank form. Similarly, and still for purposes of illustration, the centroid 1340 should be moved to the terminus of arrow 1320 in order to optimally align this feature with its counterpart on the other form. The remaining centroids 1350 have been determined to be correctly aligned.

Figure 13B:
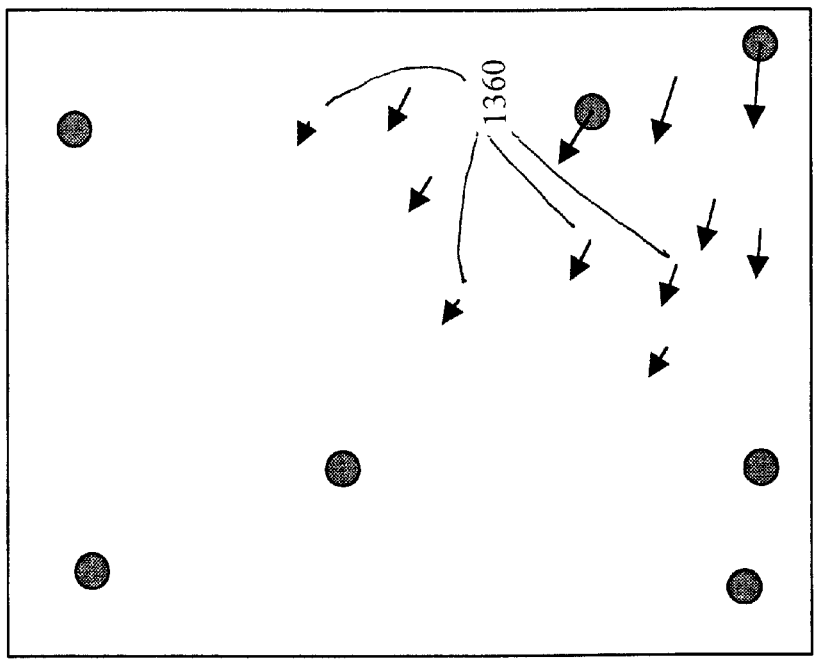

As is illustrated in FIG. 12B, a next step involves the triangulation (tessellation) of the image. That is, a set of triangular regions with boundaries 1230 are constructed which completely cover the interior of the region which is defined by the outermost centroids 1220 of the image, with each triangle vertex corresponding to one of the centroids 1220. Then, using the standard and well known Delaunay triangulation technique, a smooth field is calculated which provides the amount of offset that should be applied to each pixel in the image to cause the aberrant centroids 1330 and 1340 to be moved as nearly as possible into alignment, while perturbing the rest of the image only as much as necessary. In FIG. 13B, the arrows 1360 schematically illustrate the result of the previous computation. As can be seen, pixels in the lower right hand corner of the image are moved the greatest distance, with pixels that are further away from that locus being generally relocated to a lesser extent. The general absence of arrows in the upper left portion of the image indicates that those pixels need not be relocated.

Determining the Offset Distances

Of course, calculation of such of any of the previously discussed transformations ultimately requires that corresponding areas be located in the blank 10 and target 20 forms. Then, given the "x" and "y" coordinates of these corresponding regions (e.g., the shaded regions 40/40', 50/50', and 60/605' of FIG. 1 form 10), any of the well known mathematical transformations discussed previously transformation may be employed. (FIG. 3) describes how to transform (scale, warp, and translate) the scanned target image 20 to cause it to match as nearly as possible the orientation of the blank form 10.

Figure 8A:
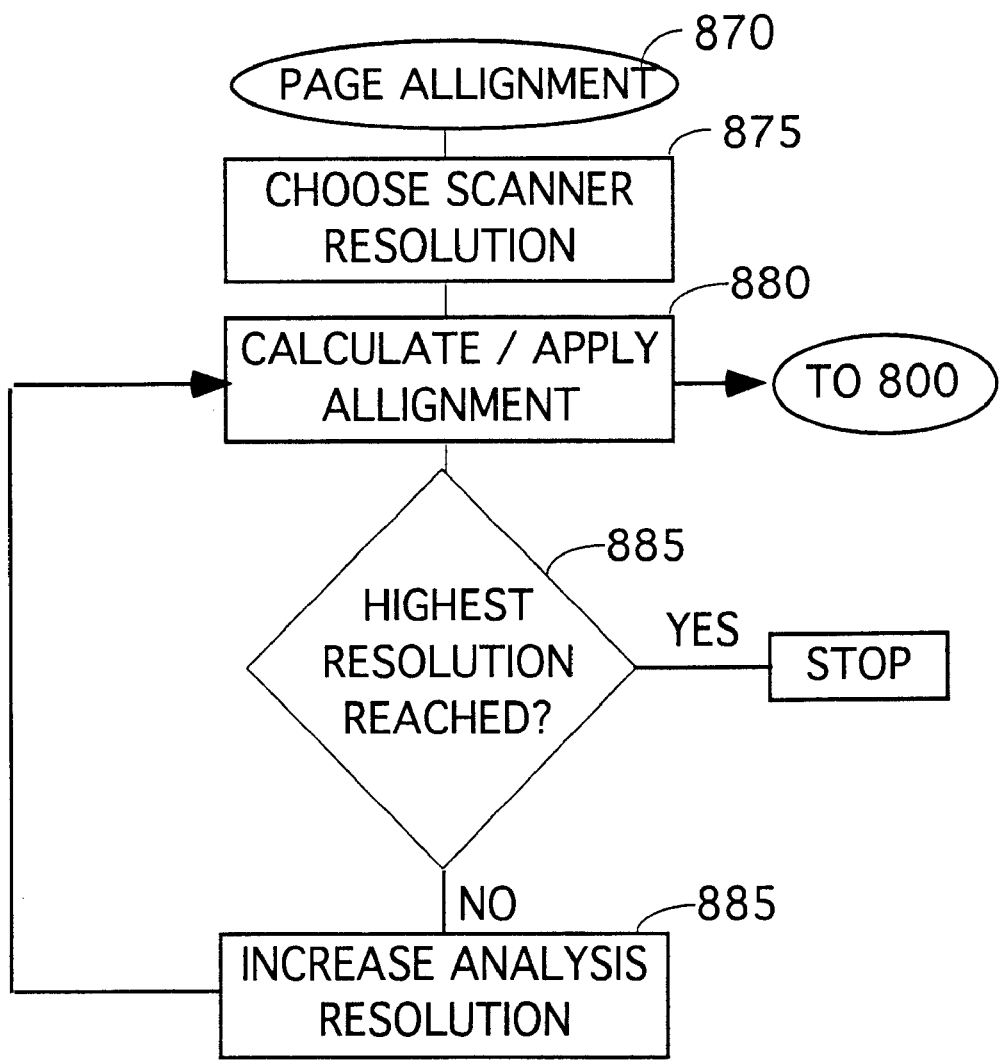
FIGS. 8A and 8B contain flow charts that describe the page alignment feature of the instant invention.
Figure 8B:
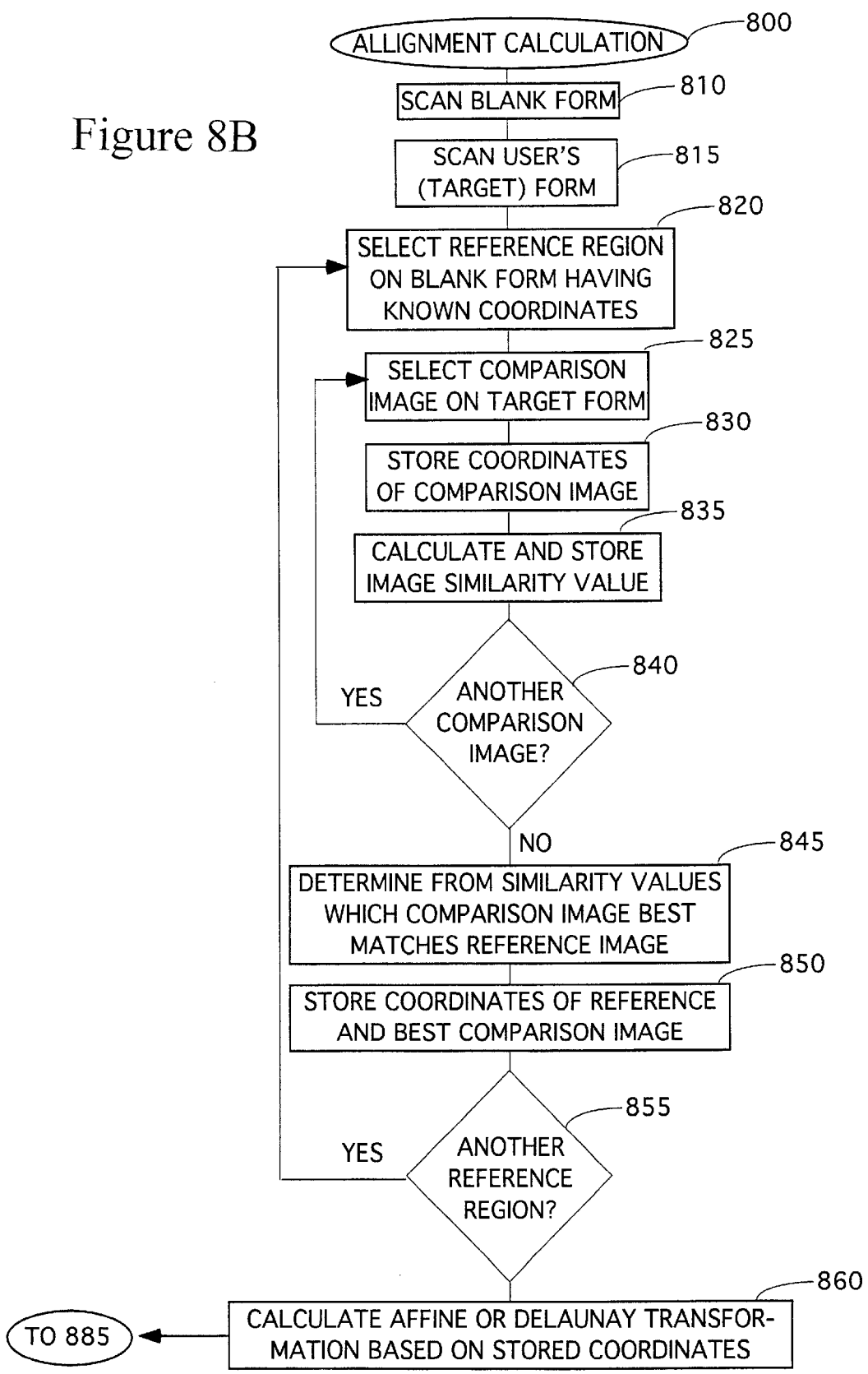

The preferable way of automatically obtaining the coordinates of corresponding regions on the two forms—even if the two forms are significantly misaligned—is as is set out in FIGS. 8A and 8B and as described hereafter.

Figure 6:
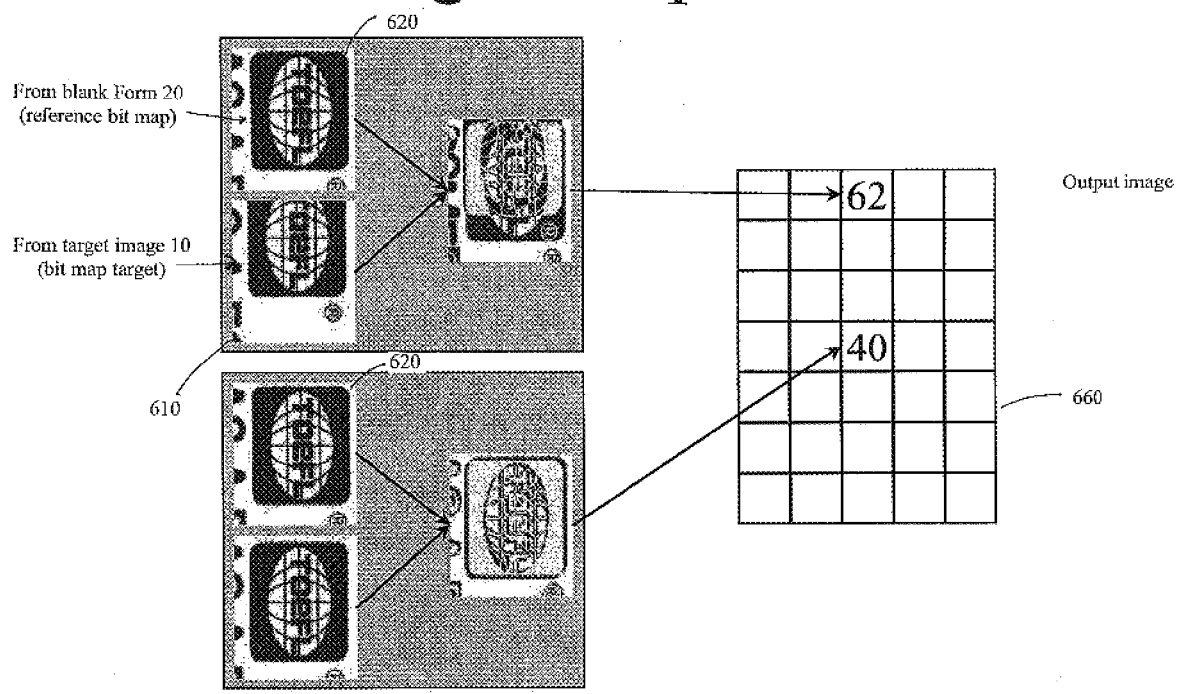
FIG. 6 illustrates the preferred method of quantitatively comparing two images in order to determine their degree of similarity.

As a first step and is as illustrated in FIGS. 8B and 6, a relatively unique region of the scanned blank form 20 (a "reference" bitmap 620) is pre-selected for comparison with the scanned target image 10 (step 820). In this example, the logo "TOEFL" 40' together with some small amount of surrounding "white space" has been selected as a reference bitmap. Note that these are not "registration" marks in the usual sense, because they have not been precisely printed in any particular location on the form. The instant reference bitmaps could potentially be taken from any sort of printed text or graphics on the form. Further, although the method preferably works with a plurality of pre-selected reference bitmaps, as few as one could be used.

Figure 7:
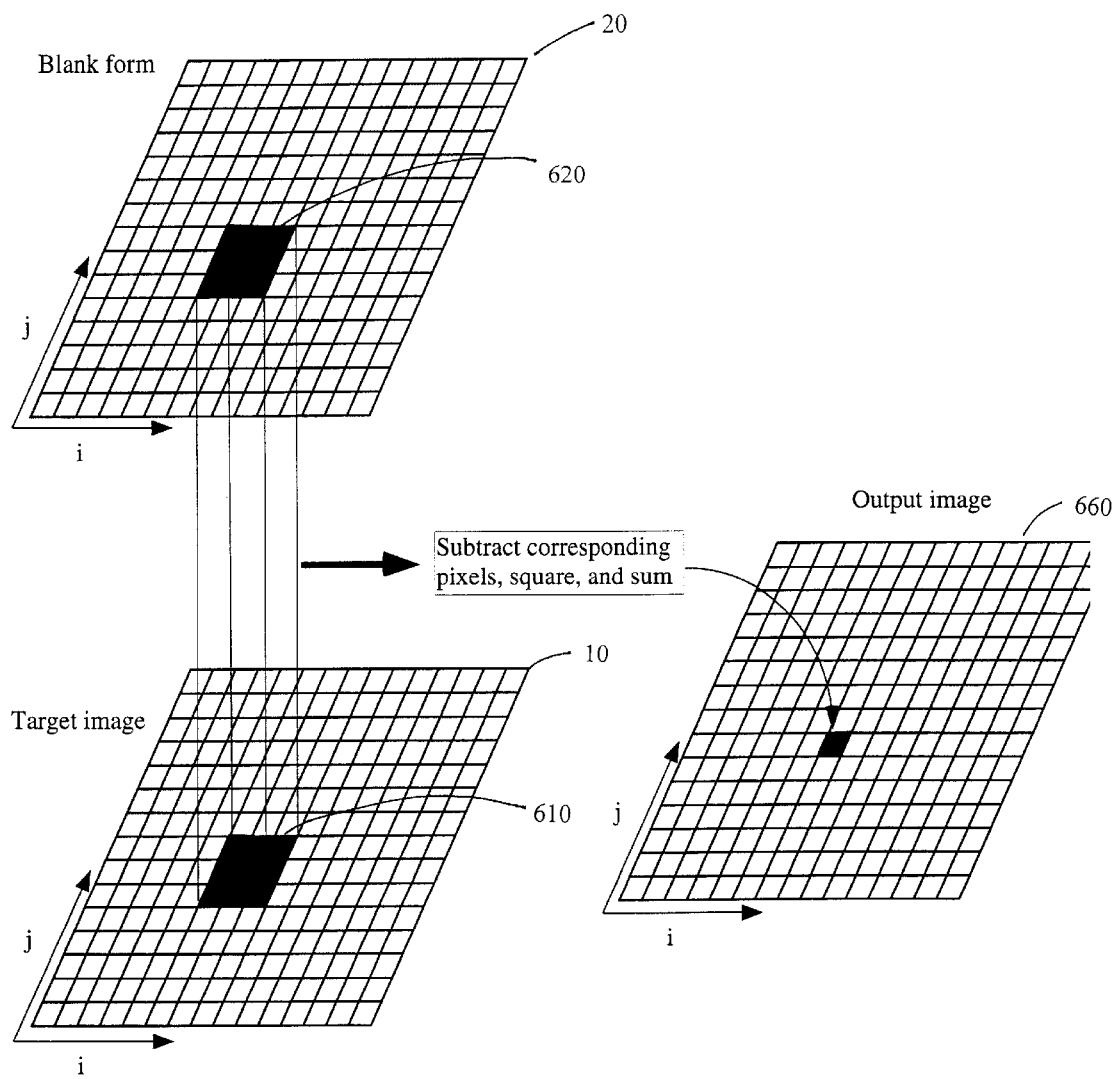
FIG. 7 contains a schematic diagram that explains in more detail the method of FIG. 6.

Next, a plurality of same-size portions of the scanned target image 20 are selected for comparison (the "target" bitmap 610) with the reference bitmap 620 (steps 820 through 840). It is anticipated that at least one of the selected plurality of target bitmaps will contain the same reference mark as was pre-selected on the control form. Then, each of the target bitmaps are compared with the reference bitmap (step 845) according to the following method which yields a numerical value that is representative of the degree of similarity (or dissimilarity) between those two maps. In the preferred embodiment (FIG. 7), the numerical measure of similarity is calculated by:

(a) Subtracting, pixel by pixel, the scanned value of the comparison bitmap 610 from the corresponding pixel in the target bitmap 620;

(b) Squaring the calculated difference between each pixel value; and, (c) Summing all of the squared differences so obtained.

Of course, those skilled in the art will recognize that the previous steps are just one of many possible methods of calculated the numerical "distance" between the two bitmaps. For example, rather than squaring and summing the differences, the sum of the absolute values might be computed, or the geometric mean might be calculated, the statistical correlation or covariance between the two bitmaps might be calculated, or the mean, median, or mode of the numerical values might be used instead.

This numerical value is then preferably stored in output image 660, preferably at a location corresponding to the coordinates of the center of the target bitmap 610. It should be clear to those of ordinary skill in this art that the output digital values need not necessarily be stored on disk or formed into an image, but rather they could be maintained in computer RAM in some sort of organization that would allow them to be searched and each difference associated with the location of the comparison bitmap that gave rise to it.

Of course, in practice the previous numerical method will yield a value numerically equal to "zero" if and only if a perfect match is obtained between the reference 620 and target 610 bitmaps. In that unlikely occurrence, the location of the target bitmap 610 will then serve as one input to an affine transform as discussed previously. However, in the more likely case that the similarity measurement is non-zero, another region of the target image 10 is selected for comparison. (FIG. 6). The previous computation is repeated using the new target bitmap, and the result is once against written to the output image 660 at a location corresponding to the center of the new target bitmap. Obviously, this process may be repeated many times, allowing the reference 620 bitmap to be compared to a number of different locations on the target image 10. After a predetermined area has been covered, the best corresponding location on the target image 10 is selected. In the preferred embodiment, the selected location will correspond to the value in the output image 660 that is nearest zero, although many alternative arrangements are possible. The location (i.e., "x" and "y" coordinates) of the selected minimum value will then be used in a subsequent affine transform of the target image (step 850).

Improving the Transformation

Given the transformational parameters obtained by the previous calculations, the target bitmap is then preferably transformed accordingly. However, it is anticipated that this single transformation might not be enough to bring the two images into alignment with the precision which is required for subsequent sensing of the user's marks. Thus, and as is illustrated in FIG. 8A, the instant inventor anticipates that an iterative series of these transformations might be necessary. In more particular, in the preferred embodiment the initial scanning and subsequent calculations are preferably performed using a fairly low resolution scanned image, e.g. about 25 dpi (step 875). Then, after the image has been aligned to the extent possible at this resolution, the calculations are repeated with successively higher resolution scanned images (e.g., at 50 and then 100 dpi) until the maximum resolution is reached (steps 880 and 885). Obviously, it is possible that the two images might actually be rescanned at each of these resolutions or, alternatively, a single scan might be made at the highest contemplated resolution and then lower resolution versions of this scan might be calculated by methods well known to those skilled in the art.

Additionally, the term "lower resolution" should be interpreted in its broadest sense to include any version of an image that has reduced detail (information content) from that of the original. For example, the "lower resolution" images used in the previous step might be calculated for both the reference and target images by applying the same 2D high-cut filter to each. For example, if the two images are both "smoothed", thereby removing high frequency components from the image, "lower resolution" outputs are obtained. Similarly, reduction in resolution by sampling, filtering (by, for example, 2D Fourier transform or Walsh transform, etc.), morphological operations (like dilation/ erosion) could all be used to create the lower resolution versions of the digital images.

Further, it is anticipated that the instant interative improvement could be performed using successive applications of the same transform (e.g., affine) or combinations (e.g., affine followed by Delaunay followed by affine, etc.). Whatever the particular combination of transforms, the instant inventor specifically contemplates that a number of such transforms or combinations of same might be calculated, with the transformation that is ultimately chosen being the one which best fits the data.

Finally, in some instances it could prove to be advantageous to use the transformation from the previous scanned user-marked form as a starting point in aligning the current form. That is, it is not uncommon that a scanner will have some defect that misaligns all of the pages that it is given similarly (e.g., the scanner may skew all of pages it reads slightly to the left). Thus, when deciding which transformation to use, one of the candidates is preferably the transformation that was used in the previous form, as applied to the current form.

The purpose of the previous operation is to bring the target form image into at least rough alignment with the reference image. However, the instant inventor contemplates that there could still be small errors in the locations and the mean intensities of individual bubbles which could make direct comparison of the two images unreliable. These variations can be introduced by the image scanning press, the printing process, or by distortions of the physical paper by changes in humidity, folds, tears, etc. The locations could vary on the order of a few pixels (see, e.g., FIG. 4) and the user-marked bubbles could be substantially brighter or darker than the blank template bubbles. Thus, corresponding bubbles may not usually be reliably compared. However, the instant inventor has developed methods for correcting these variations and allowing the bubbles to be compared.

Adjusting the Relative Image Intensities

Figure 14A:
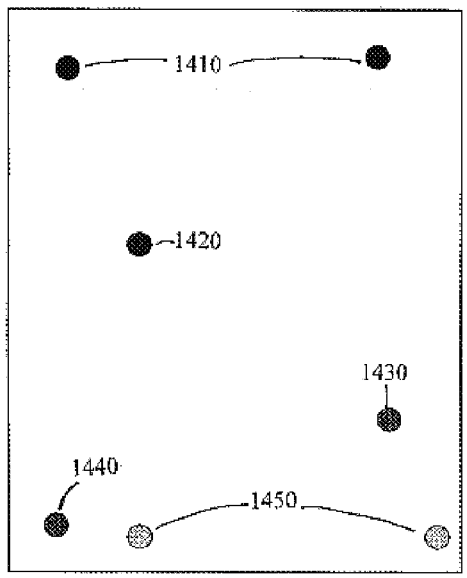
FIGS. 14A and 14B illustrate a scenario wherein a scanner has created a systematic intensity bias variation in the scanned image.
Figure 14B:
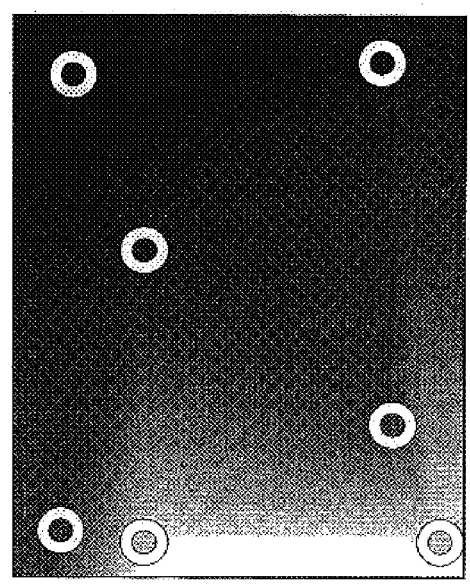
Figure 15:
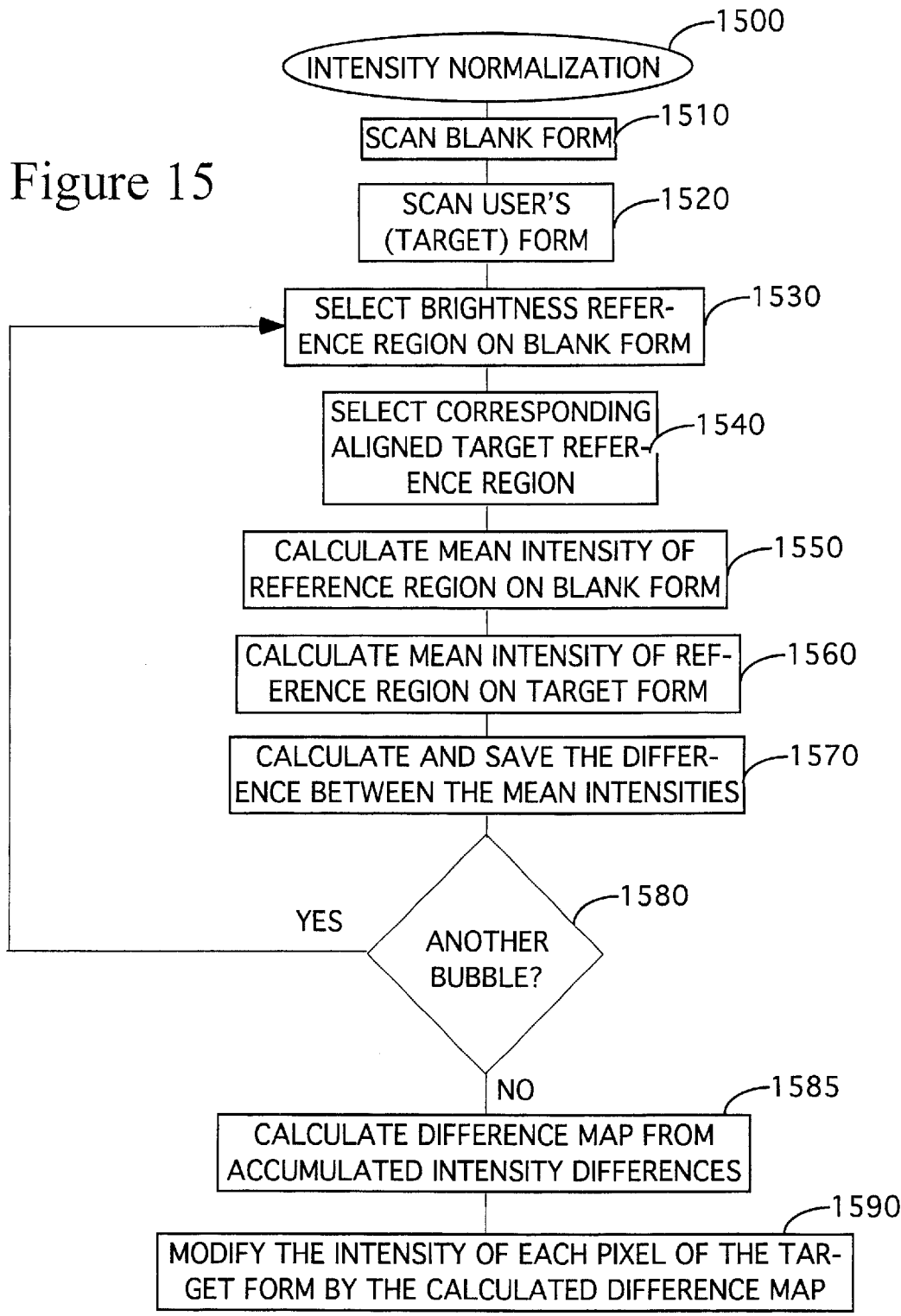
FIG. 15 illustrates a preferred program logic for normalizing the intensity of a scanned image.

According to another aspect of the instant invention and as is generally set out in FIGS. 14 and 15, there is provided a method of adjusting the relative intensity of the target and reference form that preferably utilizes the Delaunay triangulation to perform that adjustment. As is generally illustrated in FIG. 14A, it is not uncommon with high performance scanners to see that the process of scanning the target image introduces a systematic intensity bias across the face of the page. The filled circles in this figure represent the intensity differences between corresponding portions of the page between the target and reference image. For purposes of illustration, the circles 1410 illustrate a portion of the target image that is much darker than the corresponding portion of the reference image. Similarly, circles 1420, 1430, and 1440 are progressively lighter. Finally, circles 1450 indicate that the target image is much lighter than the corresponding reference image. Taken together, the circles of FIG. 14A broadly represent the situation wherein the scanner has introduced a lightening bias that has generally produced a target image that needs to be darkened at the top and lightened at the bottom to make it match as nearly as possible the reference image. FIG. 14B illustrates a preferred image correction map that would reverse the bias introduced by the scanner. FIG. 15 illustrates the preferred steps in this process.

As is illustrated in FIG. 15, the function of the main loop is to accumulate a number of comparisons 1570 between the intensity of a region on the blank form 1550 and the corresponding intensity of the target form 1560. Although in this figure the comparison is between "mean" intensities, that is only one way to compare these intensities, those skilled in the are will recognize that any sort of difference measure between the pixels in these two regions could be used instead (e.g., arithmetic average, geometric average, median, mode, sum of squared differences, sum of absolute value differences, etc.) In the preferred embodiment, the corresponding regions will be organized in a uniform grid that covers the entire form. Alternatively, the regions can be selected according to other criteria. It should be noted that the corresponding regions need not be uniformly spaced.

In the preferred embodiment, when the difference is computed 1570 that resulting value represents the quantity that should be added to each pixel near the selected point to cause both target and reference images to have approximately the same overall intensity or brightness.

Finally, a difference map is calculated 1585 from the accumulated intensity differences. In the preferred embodiment, the difference map will be calculated via the Delaunay triangulation discussed previously. This calculation then results in an image similar to that illustrated in FIG. 14B, which contains a smoothly interpolated image intensity that is designed to be added to the target image—preferably pixel-by-pixel—which corrects for the bias introduced by the scanner (step 1590).

BUBBLE ALIGNMENT

Figure 11:
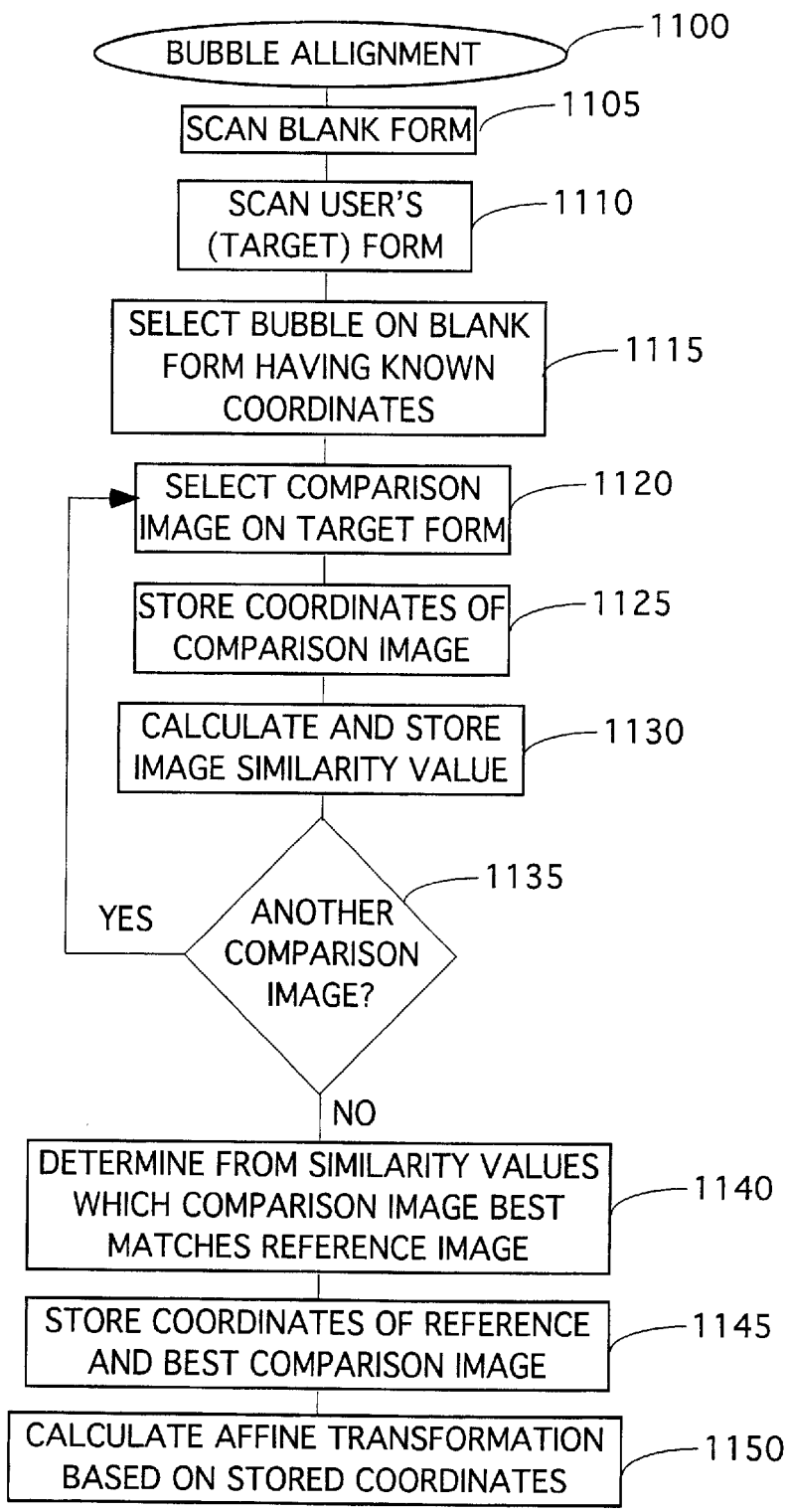
FIG. 11 illustrates the principle steps in the preferred bubble alignment method.

According to another aspect of the instant invention and as is generally illustrated in FIG. 11, there is provided a method of preparing bubbles for later OMR which generally involves bringing a bubble from the user-marked target form into the best possible alignment with a bubble from the reference/blank form. To the extent that the two bubbles can be aligned, the subsequent OMR step will be much simpler and will yield more reliable results. The discussion that follows indicates a preferred method of bringing one bubble into alignment with another. Obviously, if the test/questionnaire contained multiple bubbles (as would normally be the case) the instant method would be repeated for each bubble thereon. Additionally, this method would preferably follow application of the page alignment methods discussed previously, which page alignment methods would generally be expected to bring corresponding bubbles on the blank and marked forms into approximate alignment.

Turning now to a discussion of the instant embodiment, in the preferred arrangement the instant method begins with the digitization of a blank form (step 1105) and a scan of the user's (target) form (step 1110). Then, a bubble on the blank form is selected (step 1115), the blank-form bubble (or "reference bubble") having known location coordinates. For example, the defining coordinates might be the corners of a rectangle that encompasses the bubble, the coordinates of the vertices of an encompassing polygon, the center and radius of an enclosing circle, etc. The coordinates themselves could be measured in terms inches, pixels, etc. Those of ordinary skill in the art will recognize that exactly how a bubble's location is described is not important to the practice of the instant invention.

As a next preferred step, a comparison image is selected on the target form (step 1120). The comparison image is a region of the target form that could possibly contain the bubble that corresponds to the selected bubble on the blank form. Preferably, the first such comparison image selected will be located in the same position on the target form as the reference bubble is located on the digitized blank form. To the extent that the target form has been accurately aligned with the blank form, the preferred choice may indeed include the pixels that image the corresponding bubble on the marked form. However, that will not generally be the case and the steps that follow assume that the initial selection may not prove ultimately to be the best choice.

As a next preferred step 1125, the coordinates of the selected comparison image are noted and stored. Needless to say, the coordinates might be stored in computer RAM or in any other storage media.

Given the comparison image and the reference image, a similarity is then calculated between the pixels in the two bitmaps. Preferably, the similarity (or distance between the two bitmaps) is calculated according to the method of FIG. 9 (discussed hereinafter), although many other methods might be used instead. The calculated similarity (or, alternatively, dissimilarity) value is then retained for comparison with others that are obtained as is described next.

The next preferred step 1120 is to select another comparison image that is at a different location than the one selected initially, the idea being to select a series of comparison images that are offset slight from each other (and from the location of the reference bubble) and which cover the region surrounding where the reference bubble would be expected to appear. Given a new comparison image, the similarity between this image and the reference image is calculated and retained according to the method described previously. The method continues until some specified number of comparison images have been processed.

Once all of the comparison images have been processed (step 1135) the method preferably continues by comparing the calculated similarity values to determine which comparison image was most similar to the reference image. Given that value and the location of the corresponding image on the target form, it is possible to calculate a rule for adjusting the target image bubble bitmap to make it coincide as nearly as possible with the reference image bitmap (step 1150).

Note that if the reference and target bubbles have identifiable features therein (e.g., see FIG. 4) it would be possible to calculate multiple corresponding locations within a bubble, thereby making it possible to calculate a full affine transformation which translates and/or rotates one bubble to make it match the other. Similarly, the bitmap from the blank form might actually include multiple bubbles therein (e.g., a row of three bubbles). The comparison image would then preferably be same-sized and the resulting best match would indicate the location at which the three bubble suite was most in alignment. Finally, it should be clear that any number of different sized image regions (which image regions might include any combination of portions of a bubble and/or multiple bubbles) might be used to compile a collection of locations that would be suitable for use with an affine transformation that could provide local realignment of the two images for purposes of fine-tuning the whole-page alignment discussed previously. Thus, in the text and claims that follow, when a bitmap that contains a "bubble" is called for, that should be taken to mean a bitmap that contains a bubble, a portion of a bubble, or multiple bubbles.

Figure 4:
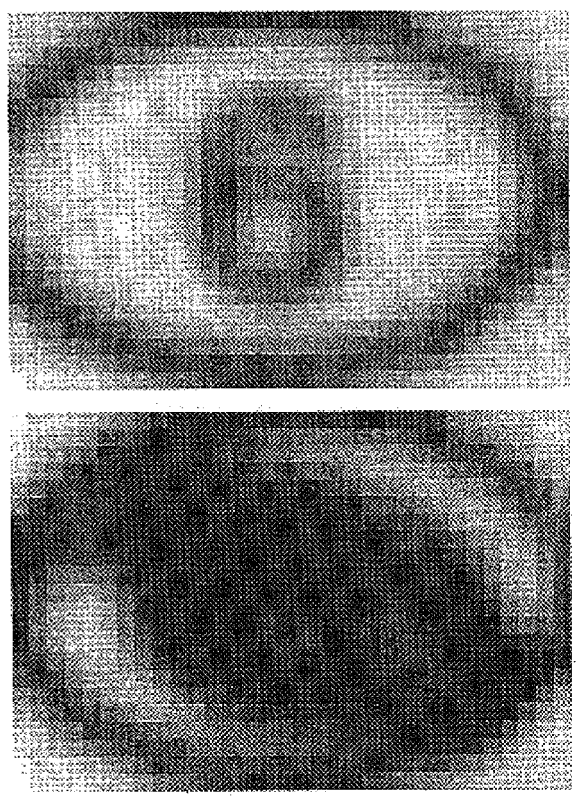
FIG. 4 illustrates the general problem of comparing an unmarked bubble with a bubble that has been partially filled in by the user, wherein the marked bubble is shifted by about 1 pixel with respect to the unmarked bubble.

Finally, it should also be noted that (as is illustrated in FIG. 4) it will often be the case that a blank bubble is being aligned to match a marked bubble. In such a case, none of the calculated similarities may be very meaningful. However, since the goal is to determine where marks have been placed on the form, even a very rough alignment will be sufficient for purposes of the steps that follow. Further, by using single bubble regions together with two bubble, three bubble, etc., regions it is still possible that a reasonably good alignment might be obtained between the two images.

OMR

Figure 9:
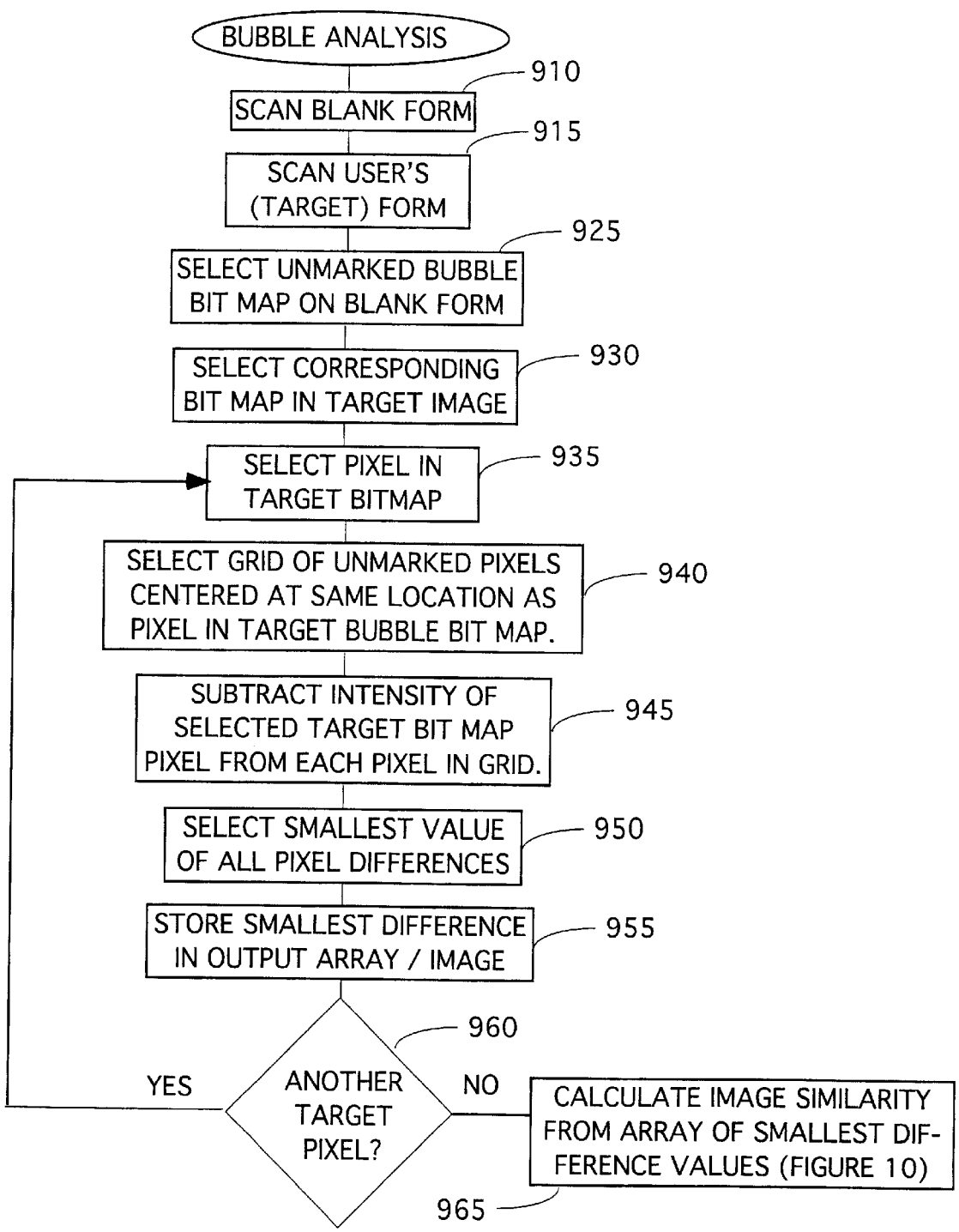
FIG. 9 contains a flow chart that illustrates the principle preferred steps in the bubble analysis method.

According to another preferred aspect of the instant invention and as is illustrated in FIG. 9, there is provided a method of comparing two digital images that are not in precise alignment, but which are at least "roughly" aligned, where "roughly in alignment" would generally be taken to mean that the two images might be misregistered by a few pixels in the horizontal and/or vertical directions. For purposes of this embodiment, it will be assumed that the two images are scaled to be the same size.

As a first step, and as is generally illustrated in FIGS. 6 and 9, a bitmap containing an unmarked bubble on the blank form 10 is selected (step 925), the coordinates of each bubble having been previously determined on the blank form (the "unmarked bubble" bitmap, hereinafter). Of course, as is illustrated in FIG. 6, it is possible that some additional "white space" around the bubble might also be included. However that is not essential.

As a next preferred step 930, pixels on the target image 10 in the same location as those in the unmarked bubble bitmap are selected and extracted. In the preferred embodiment, the form will have previously been processed via the page alignment method discussed supra. As is illustrated in FIG. 6, it is expected that some misalignment between the two images—perhaps on the order of a few pixels—will still be present. Thus, the next step is to bring the two bitmaps into alignment as much as is possible.

Figure 5:
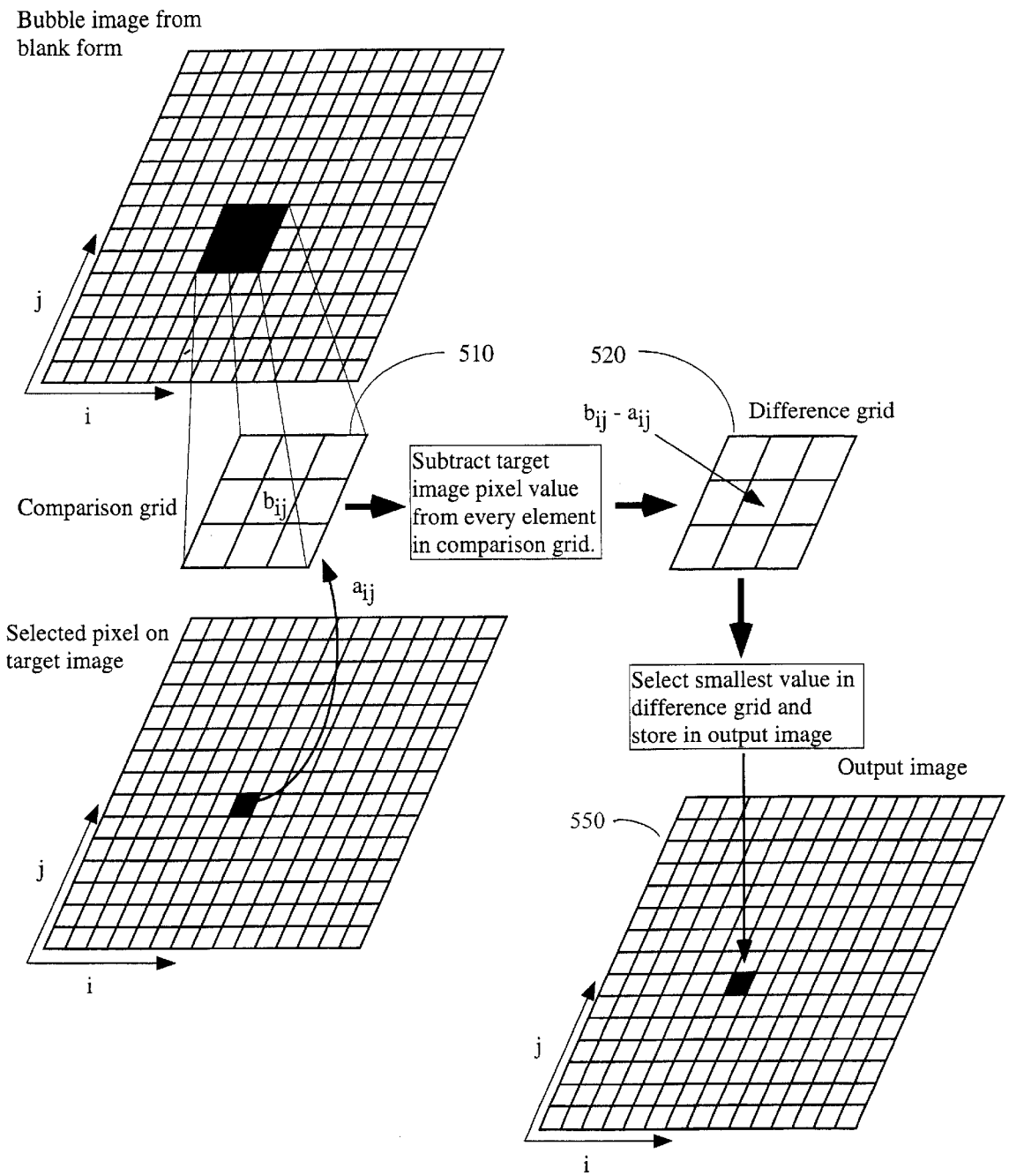
FIG. 5 contains a schematic diagram that illustrates a preferred method for small-scale alignment of a scanned blank bubble with the corresponding bubble on the user's form.

The two images are now compared according to the method generally illustrated in FIG. 5. As a first step 935, a single pixel (i,j) is selected in the target image bitmap (or, alternatively within the bubble bitmap). A comparison grid 510 of numbers is then extracted from the bubble bitmap, with the grid selected so as to encompass the same (i,j) location as the pixel in the other bitmap (step 940). In the preferred embodiment, this will be a 3 by 3 (i.e., a nine pixel) array centered on the selected pixel location (i,j), however, the size of the comparison grid 510 is not critical to the operation of the instant invention. Note that for purposes of the instant invention, it is immaterial whether it is the target or reference bitmap that provides the "single" pixel: the method would work identically in either case. However, for purposes of specificity in the text that follows, it will be assumed that it is the target bitmap that provides the single pixel that is compared against an array of pixels from the blank-form bitmap.

As a next step, the value of the single selected pixel is subtracted from each pixel in the comparison grid 510, thereby producing a difference grid 520 (step 945). Then in step 950, the measure of similarity between the two images at this point is calculated. In the preferred embodiment, the (dis)similarity measure of choice is the absolute value of the minimum calculated difference in the difference grid. That single value is then stored in the output image (step 955). Obviously, if this similarity value is equal to zero, there must have been at least one pixel in the comparison grid that exactly matched the value of the selected individual pixel.

The previous step is repeated for every pixel within the bitmap from the target image. At the conclusion of this process, an output array or image 550 has been formed that measures the general similarity between the two bitmaps and which should be relatively insensitive to misalignments of a few pixels (step 965). Obviously, if the output image is composed entirely of zeros, the bubble from the blank form must exactly match the bubble from the target image and, thus, the user has not modified the reflectance characteristics of the target bubble by marking within it. However, more generally there will be many non-zero values in the output image 550. So, an additional step will generally be necessary to determine whether or not a mark is present.

Now, as a final step, the calculated output image from the previous step is used to determine whether or not the particular under scrutiny bubble on the target image has been filled. This might be done any number of ways, but in the preferred embodiment one or more of the following values measured from the difference grid 520/and or the target image bitmap would be used:

(a) The average difference of all of the pixels in the output image 550;

(b) The maximum value of all of the pixels in the output image 550; and/or (c) The average darkness of the target image bitmap.

Clearly, any single measure listed above or any linear or nonlinear combination of same could be used. The operator can modify the weights globally or for an individual bubble when a form is first registered with the system or when a marked form is processed. This allows the output from the system to be conveniently calibrated to produce the desired result.

Figure 10:
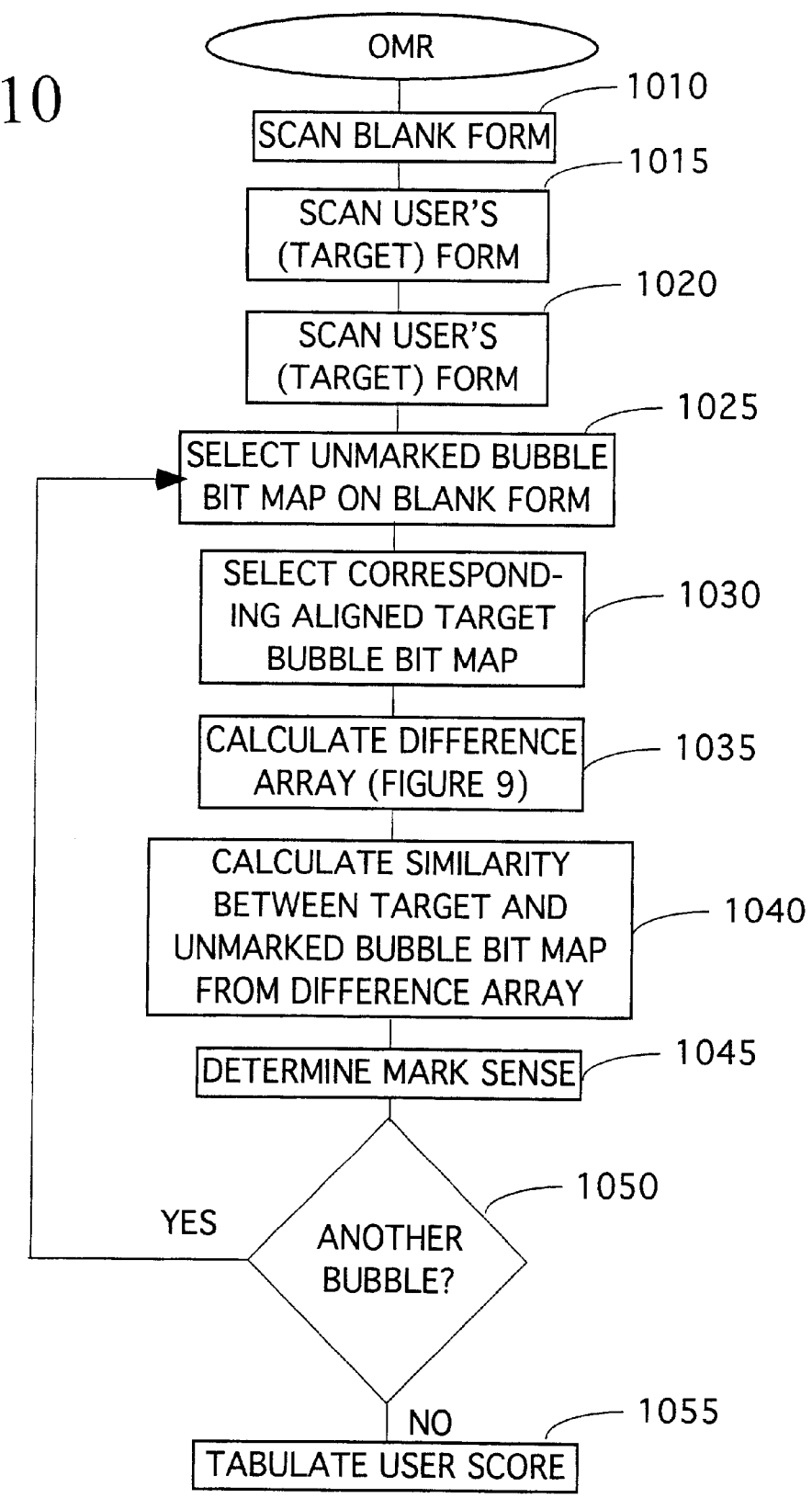
FIG. 10 contains a flow chart that describes the preferred OMR method.

As is illustrated in FIG. 10, the foregoing can readily be used for purposes of OMR or in the determination of mark sense. In more particular, it is anticipated that the previous method would be repeatedly applied to every bubble of interest on a test form (steps 1025 through 1050) to determine how the respondent has marked the form that is being analyzed. At the conclusion, i.e., once the user's responses within each bubble have been accumulated, it is anticipated that a tabulated score (step 1055) will be printed for that user.

Any one of these measures standing alone would theoretically be enough to determine whether or not a user has marked within a particular bubble. However in the preferred embodiment, multiple measurements of this sort will be used to make that determination. Further, in some cases it might prove to be advantageous to combine the previous measures with, for example, similar calculations performed just on the center of the bubble. Either way, those skilled in the art can easily develop a weighting scheme incorporates this additional information.

OTHER APPLICATIONS OF THIS TECHNOLOGY

Although the preferred embodiment has been described in the sense of determining whether or not particular "bubbles" have been filled in on a form, the range of potential applications are much broader than that single use. For example, the instant invention would be suitable to read survey questionnaires, sales reports, inventory control/market research, medical records (many hundreds of possible specific applications), census data, immigration (entrance and exit cards), conference registrations/surveys, assessments (outside of K-12 education, including law school admissions, AICPA (CPA exam), nursing Licensees (national board), FAA written test, and accident reporting (including ambulance call reports and police contact reports).

CONCLUSIONS

As is well known to those of ordinary skill in the art, a program embodying the instant invention might be conveyed into the computer that is to execute it by means of, for example, a floppy disk, a magnetic disk, a magnetic tape, a magneto-optical disk, an optical disk, a CD-ROM, a DVD disk, or loaded over a network. The precise mechanism by which the methods of the instant invention are stored and/or transmitted to a computer for execution is not important to the practice of the invention taught herein.

The term "form" as it is used herein should be broadly interpreted to include any sort of document which contains regions in which the user can respond and in which the responses can be sensed by optical means. That is, this method can be used where the user indicates responses by writing inside of these regions, which writing may be in the form of marks or characters. The form might contain text and/or graphics. Also as used herein, a "user" may be either human or machine. Further, mark detection includes methods of ascertaining whether the user has first written an answer and then modified it by erasing, etc. Finally, the term "bubble" should be used in its broadest sense to include any region of a form in which a user can mark including, without limitation, squares, brackets, connect-the-lines, and any other type of human response mechanisms by which an individual's choice can be signified on a piece of paper, touch sensitive computer screen, or the like.

It should also be noted that when a transformation (such as the affine transformation) is calculated the output from such a calculation provides a mathematical formula or rule for adjusting the orientation of the target image with respect to the reference image so that the two match in orientation as nearly as possible. The rule that is embodied in the calculated transformation may be as simple as a lateral (or horizontal) shift of one image with respect to the other, or as complex as nonlinear stretching, shrinking and/or rotation of either image. Further, it should be clear to those of ordinary skill in the art that it is immaterial whether the reference image is "moved" according to the specified rule to make it coincide with the target image or whether it is the target image that is moved with respect to a stationary reference image. Thus, in the claims that follow, when the target image is said to be adjusted to make it coincide with the reference image, that language should also be understood to cover the case where it is the reference image that is adjusted.

It should further be noted that when one image is described as being "moved" or aligned with respect to the other that term should be interpreted in its broadest sense to include relocation of the image bitmaps in memory as well as various "addressing" schemes that do not require actual relocation of either image. That is, rather than actually applying a shift or rotation to either image, those of ordinary skill in the art will recognize that it is possible to leave both images in place and instead use the calculated rule/rules to select pixels from the images as though they had been moved according to that rule. As a simple example, if the image adjustment rule calls for shifting the target image 10 pixels to the left with respect to the reference image, that rule might be applied by simply responding to each request for a pixel from either image by providing the pixel at the "shifted" location instead. Obviously, even very complex mathematical transformations might be handled in this manner. Thus, it should be clear that this is no need that one image ever actually be relocated in memory to correspond to the calculated rule.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of aligning a user-marked document for optical mark recognition, wherein is provided a reference document and at least one target document, comprising the steps of:
   (a) selecting one of said at least one target documents;
   (b) obtaining a digital representation of said selected target document, thereby obtaining a digital target document;
   (c) obtaining a digital representation of said reference document at a predetermined digital resolution, thereby obtaining a digital reference document;
   (d) selecting a reference region within said digital reference document, said reference region
      (d1) corresponding to a predetermined portion of said reference document,
      (d2) having a predetermined location within said digital reference document, and,
      (d3) containing a plurality of reference pixels therein;
   (e) selecting a target region of said digital target document, said target region
      (e1) having a location at least approximately corresponding to said predetermined location within said digital reference document, and,
      (e2) having a plurality of target pixels contained therein;
   (f) determining from said reference pixels and said target pixels an offset between said reference region and said target region;
   (g) performing steps (c) through (f) at least once;
   (h) calculating an image adjustment rule from any offsets so calculated;
   (i) applying said image adjustment rule, thereby at least approximately aligning said digital reference document and said selected digital target document;
   (j) performing steps (c) through (i) at least twice using at least two different digital resolutions; and,
   (k) determining from said digital target document, said digital reference document, and from any adjustment rules so calculated whether said user-marked document contains a user mark within a predetermined region of said user-marked document.

2. A method according to claim 1, wherein said digital representation of said selected target document is a gray scale image.

3. A method according to claim 2, wherein said digital representation of said selected target document is a 4-bit digital gray scale image.

4. A method according to claim 1, wherein said digital representation of said selected target document is a digital color image.

5. A method according to claim 1, wherein step (a) includes the step of scanning said reference document at a predetermined resolution, thereby obtaining a digital reference image.

6. A method according to claim 1, step (h) includes the step of calculating an image adjustment rule using an affine transform.

7. A method according to claim 1, step (h) includes the step of calculating an image adjustment rule using a Delaunay triangulation method.

8. A method according to claim 1, wherein step (g) includes the step of repeating steps (d) through (f) at least three times.

9. A method according to claim 1, wherein step (i) includes the step of applying said image adjustment rule by mathematically relocating said selected digital target document according to said image adjustment rule.

10. An apparatus for aligning a user-marked document for use in optical mark recognition according to the method of claim 1, comprising:
(a) a computer configurable to access said digital reference document and said digital target document, wherein said computer contains instructions programming said computer to perform said method.

11. An apparatus according to claim 10, further comprising:
(b) an electronic scanner,
(b1) said scanner being configurable to scan at a plurality of different digital resolutions, and,
(b2) said scanner for obtaining digital representations of at least said reference document at a plurality of predetermined digital resolutions, thereby creating digital reference documents at said plurality of predetermined digital resolutions, said digital reference documents being positionable to be made accessible by said computer.

12. A device adapted for use by a digital computer wherein a plurality of computer instructions defining the method of claim 1 are encoded,
said device being readable by said digital computer,
said computer instructions programming said digital computer to perform said method, and,
said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

13. A method according to claim 1, wherein said step (f) includes the steps of:
(f1) selecting a trial offset,
(f2) calculating a numerical distance between a plurality of said reference pixels and a corresponding plurality of said target pixels using said trial offset,
(f3) performing steps (f1) and (f2) a plurality of times,
(f4) determining from any numerical distances so calculated an offset between said reference pixels and said target pixels.

14. A method according to claim 13, wherein step (f4) includes the step of:
(i) calculating a minimum value of any numerical distances so determined, said minimum value being associated with a particular trial offset,
(ii) selecting said particular trial offset corresponding to said minimum numerical distance as an offset between said reference pixels and said target pixels.

15. A method according to claim 13, wherein said step (f2) includes the steps of:
(i) subtracting pixel-by-pixel a plurality of said reference pixels from said target pixels using said trail offset, thereby producing a plurality of pixel differences,
(ii) squaring any pixel differences so produced, thereby producing squared pixel differences, and,
(iii) summing together any squared pixel differences so produced, thereby calculating a numerical distance between said plurality of reference pixels and said corresponding plurality of target pixels.

16. A method according to claim 1, wherein said digital reference document has a reference document intensity level, and wherein step (c) includes the steps of:
(c1) obtaining a digital representation of said selected target document, thereby obtaining a digital target document, said digital target document having a target image intensity level, and,
(c2) adjusting said target image intensity level to at least approximately match said reference document intensity level.

17. A method according to claim 16, wherein step (c2) includes the step of adjusting said target image intensity level to at least approximately match said reference document intensity level using a Delaunay triangulation method.

18. A method of aligning a user-marked document for optical mark recognition, wherein is provided a reference document and at least one target document, comprising the steps of:
(a) selecting one of said at least one target documents;
(b) obtaining a digital representation of said selected target document, thereby obtaining a digital target document;
(c) obtaining a digital representation of said reference document, thereby obtaining a digital reference document;
(d) selecting a reference region within said digital reference document, said reference region
(d1) corresponding to a predetermined portion of said reference document,
(d2) having a predetermined location within said digital reference document, and,
(d3) containing a plurality of reference pixels therein;
(e) selecting a target region of said digital target document, said target region
(e1) having a location at least approximately corresponding to said predetermined location within said digital reference document, and,
(e2) having a plurality of target pixels contained therein;
(f) selecting a trial offset;
(g) calculating a numerical distance between a plurality of said reference pixels and a corresponding plurality of said target pixels using said trial offset;
(h) performing steps (f) and (g) a plurality of times, using at least two different trial offsets;
(i) determining from any numerical distances so calculated an offset between said reference pixels and said target pixels;
(j) performing steps (e) through (i) at least once,
(k) calculating an image adjustment rule from any offsets so determined; and,
(l) determining from said digital target document, said digital reference document, and from any adjustment rules so calculated whether said user-marked document contains a user mark within a predetermined region of said user-marked document.

19. An apparatus for aligning a user-marked document for use in optical mark recognition according to the method of claim 18, comprising:
(a) a computer configurable to access said digital reference document and said digital target document, wherein said computer contains instructions programming said computer to perform said method.

20. A device adapted for use by a digital computer wherein a plurality of computer instructions defining the method of claim 18 are encoded,
said device being readable by said digital computer,
said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

21. A method according to claim 18, wherein said digital representation of said selected target document is a gray scale image.

22. A method according to claim 21, wherein said digital representation of said selected target document is a 4-bit digital gray scale image.

23. A method according to claim 18, wherein said digital representation of said selected target document is a color image.

24. A method of optical mark recognition wherein is provided a reference document containing at least one reference bubble, and at least one user-marked target document, each of said at least one user-marked target documents containing a target bubble corresponding to said reference bubble therein, and each of said user-marked target documents containing at least one marked target bubble marked by a user therein, comprising the steps of:

(a) selecting one of said at least one target documents, said selected target document containing a selected target bubble therein;

(b) obtaining a digital representation of a region containing substantially all of said selected target bubble, thereby obtaining a digital target region, said digital target region containing target pixels therein;

(c) obtaining a digital representation of a region containing said reference bubble, thereby obtaining a digital reference bubble, said digital reference bubble containing reference pixels therein;

(d) selecting a pixel from among said reference pixels, said selected reference pixel having a particular location within said digital reference bubble;

(e) selecting a region within said digital target region and said target pixels therein, thereby producing a plurality of selected target pixels, said selected region corresponding at least approximately to said particular location within said digital reference bubble;

(f) calculating a numerical difference between said selected reference pixel and each of said selected target pixels, thereby producing a plurality of difference pixels;

(g) determining from said plurality of difference pixels a similarity value;

(h) performing steps (d) through (g) at least twice for at least two different selected reference pixels, thereby producing a plurality of similarity values; and, (i) determining from said plurality of similarity values whether said selected target bubble is a user-marked target bubble.

25. A method according to claim 24, wherein said digital representation of a region containing substantially all of said selected target bubble is a gray scale image.

26. A method according to claim 25, wherein said digital representation of a region containing substantially all of said selected target bubble is a color image.

27. A method according to claim 24, wherein step (i) includes the step of determining from said plurality of similarity values whether said selected target is a user-marked target bubble, an erased target bubble, or a blank target bubble.

28. An apparatus for aligning a user-marked document for use in optical mark recognition according to the method of claim 24, comprising:

(a) a computer configurable to access said digital reference document and said digital target document, wherein said computer contains instructions programming said computer to perform said method.

29. A device adapted for use by a digital computer wherein a plurality of computer instructions defining the method of claim 24 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

30. A method according to claim 24, wherein said selected region is a 3 pixel by 3 pixel region corresponding at least approximately to said particular location within said digital reference bubble.

31. A method according to claim 24, wherein step (i) includes the steps of:

(i1) calculating an average value of said plurality of similarity values, and, (i2) determining from said average value whether said selected target bubble is a user-marked target bubble.

32. A method according to claim 24, wherein step (i) includes the steps of:

(i1) calculating a maximum value of said plurality of similarity values, and, (i2) determining from said maximum value whether said selected target bubble is a user-marked target bubble.

33. A method of normalizing the relative intensity levels of one document with respect to another for use in OMR, wherein is provided a reference document containing a plurality of reference regions therein, and a target document, said target documents containing a corresponding plurality of target regions therein, each of said target regions corresponding to one of said reference regions, comprising the steps of:

(a) selecting a reference region in said reference document;

(b) selecting a target region in said target document corresponding to said selected reference region, said target region having a target location within said target document;

(c) obtaining a digital representation of said reference region, thereby obtaining a digital reference region, said digital reference region containing reference pixels therein, and said reference region having a reference location within said reference document;

(d) obtaining a digital representation of said target region, thereby obtaining a digital reference region, said digital reference region containing reference pixels therein;

(e) determining an intensity level of said digital target region;

(f) determining an intensity level of said digital reference region;

(g) calculating an intensity differential between said intensity level of said digital target region and said intensity level of said digital reference region;

(h) performing steps (a) though (g) at least twice, thereby producing a plurality of intensity differentials;

(i) calculating a difference map using at least said plurality of intensity differentials together with any of said reference locations or said target locations;

(j) obtaining a digital representation of said reference document, thereby producing a digital reference document;

(k) obtaining a digital representation of said target document, thereby producing a digital target document; and, (l) modifying at least a portion of said digital target document according to said difference map, thereby at least approximately normalizing said digital target document relative to said digital reference document.

34. An apparatus for aligning a user-marked document for use in optical mark recognition according to the method of claim 33, comprising:

(a) a computer configurable to access said digital reference document and said digital target document, wherein said computer contains instructions programming said computer to perform said method.

35. A device adapted for use by a digital computer wherein a plurality of computer instructions defining the method of claim 33 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

36. A method according to claim 33, wherein step (i) includes the step of using a Delaunay triangulation method to calculate a difference map using at least said plurality of intensity differentials together with any of said reference locations or said target locations.

37. A method of aligning a user-marked document for optical mark recognition, wherein is provided a reference document and at least one target document, comprising the steps of:

(a) selecting one of said at least one target documents;

(b) obtaining a digital representation of said selected target document, thereby obtaining a digital target document;

(c) obtaining a digital representation of said reference document at a predetermined digital resolution, thereby obtaining a digital reference document;

(d) selecting a reference region within said digital reference document, said reference region
  (d1) corresponding to a predetermined portion of said reference document,
  (d2) having a predetermined location within said digital reference document, and,
  (d3) containing a plurality of reference pixels therein;

(e) selecting a target region of said digital target document, said target region
  (e1) having a location at least approximately corresponding to said predetermined location within said digital reference document, and,
  (e2) having a plurality of target pixels contained therein;

(f) determining from said reference pixels and said target pixels an offset between said reference region and said target region;

(g) performing steps (c) through (f) at least once;

(h) calculating an image adjustment rule from any offsets so calculated;

(i) applying said image adjustment rule, thereby at least approximately aligning said digital reference document and said selected digital target document;

(j) performing steps (c) through (i) at least twice using at least two different digital resolutions; and, (k) aligning said digital target document and said digital reference document from any adjustment rules so calculated, thereby producing an aligned document for use in determining at least where on said user-marked document a user has marked.

* * * * *